US009032811B2

United States Patent
Miyauchi et al.

(10) Patent No.: US 9,032,811 B2
(45) Date of Patent: May 19, 2015

(54) ROBOT APPARATUS

(71) Applicant: KABUSHIKI KAISHA YASKAWA DENKI, Kitakyushu-shi (JP)

(72) Inventors: Nobukazu Miyauchi, Fukuoka (JP); Tamio Nakamura, Fukuoka (JP); Zenta Nakamoto, Fukuoka (JP); Dai Kouno, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/159,448

(22) Filed: Jan. 21, 2014

(65) Prior Publication Data

US 2014/0207279 A1 Jul. 24, 2014

(30) Foreign Application Priority Data

Jan. 21, 2013 (JP) ................................. 2013-008486

(51) Int. Cl.
| | |
|---|---|
| *G01L 1/24* | (2006.01) |
| *B25J 9/16* | (2006.01) |
| *B25J 13/08* | (2006.01) |
| *B25J 19/06* | (2006.01) |
| *G06F 3/042* | (2006.01) |

(52) U.S. Cl.
CPC .............. *B25J 9/1697* (2013.01); *B25J 13/084* (2013.01); *B25J 19/06* (2013.01); *Y10S 901/09* (2013.01); *Y10S 901/47* (2013.01); *G06F 3/0421* (2013.01)

(58) Field of Classification Search
USPC .......................................................... 73/800
See application file for complete search history.

(56) References Cited

U.S. PATENT DOCUMENTS

| | | | | |
|---|---|---|---|---|
| 4,694,231 | A | * | 9/1987 | Alvite' ...................... 318/568.11 |
| 2011/0036188 | A1 | | 2/2011 | Fujioka et al. |
| 2011/0307097 | A1 | * | 12/2011 | Colledani et al. ............. 700/255 |

FOREIGN PATENT DOCUMENTS

| | | |
|---|---|---|
| DE | 246816 | 6/1987 |
| JP | 58-55888 U | 4/1983 |
| JP | 59-163492 U | 11/1984 |
| JP | 60-071195 | 4/1985 |
| JP | 10-249785 | 9/1998 |
| JP | 2004-286205 | 10/2004 |
| JP | 2005-010016 | 1/2005 |
| JP | 2010-017768 | 1/2010 |
| JP | 2011-000669 | 1/2011 |
| WO | WO 2009/093451 | 7/2009 |

OTHER PUBLICATIONS

Extended European Search Report for corresponding EP Application No. 14151533.8-1712, Mar. 24, 2014.
Japanese Office Action for corresponding JP Application No. 2013-008486 May 20, 2014.
Japanese Office Action for corresponding JP Application No. 2013-008486, Dec. 10, 2013.

* cited by examiner

*Primary Examiner* — Lisa Caputo
*Assistant Examiner* — Jamel Williams
(74) *Attorney, Agent, or Firm* — Mori & Ward, LLP

(57) ABSTRACT

A robot apparatus includes an arm that includes an outer skin and a detector that detects the deformation of the outer skin. The detector includes a sending unit that sends a signal, a receiving unit that receives the signal, and a transmission route that is provided along the outer skin so as to lead the signal. The detector detects the deformation of the outer skin based on whether a signal reaches the receiving unit.

12 Claims, 8 Drawing Sheets

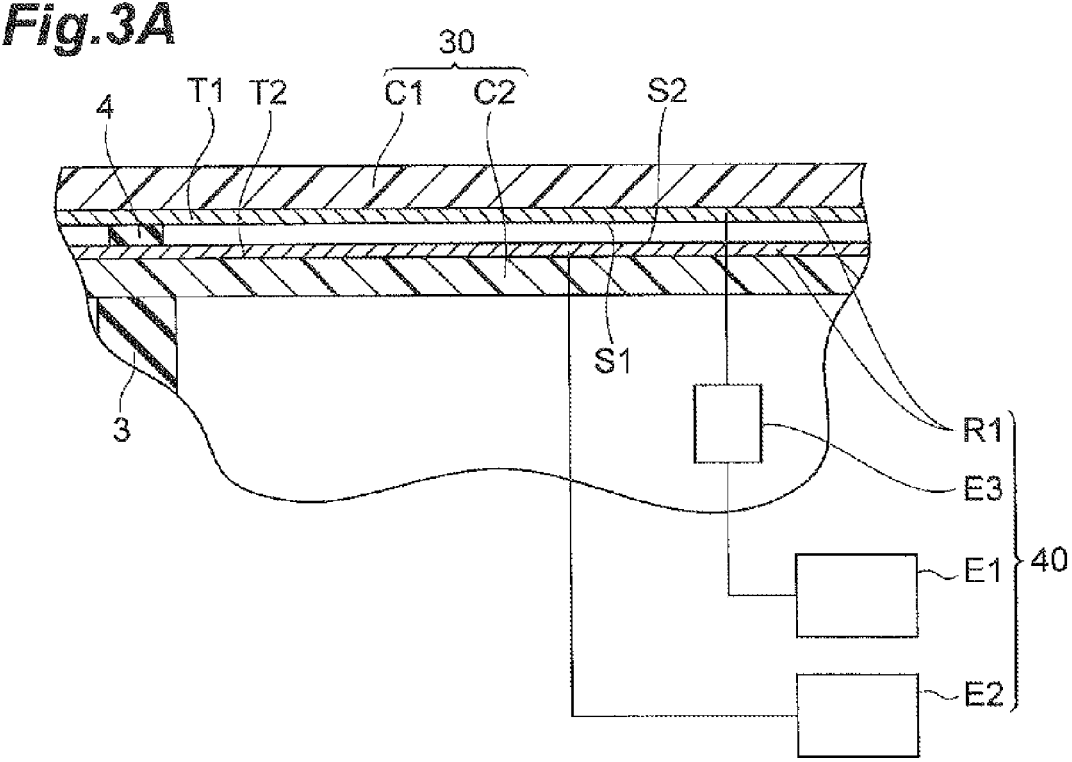
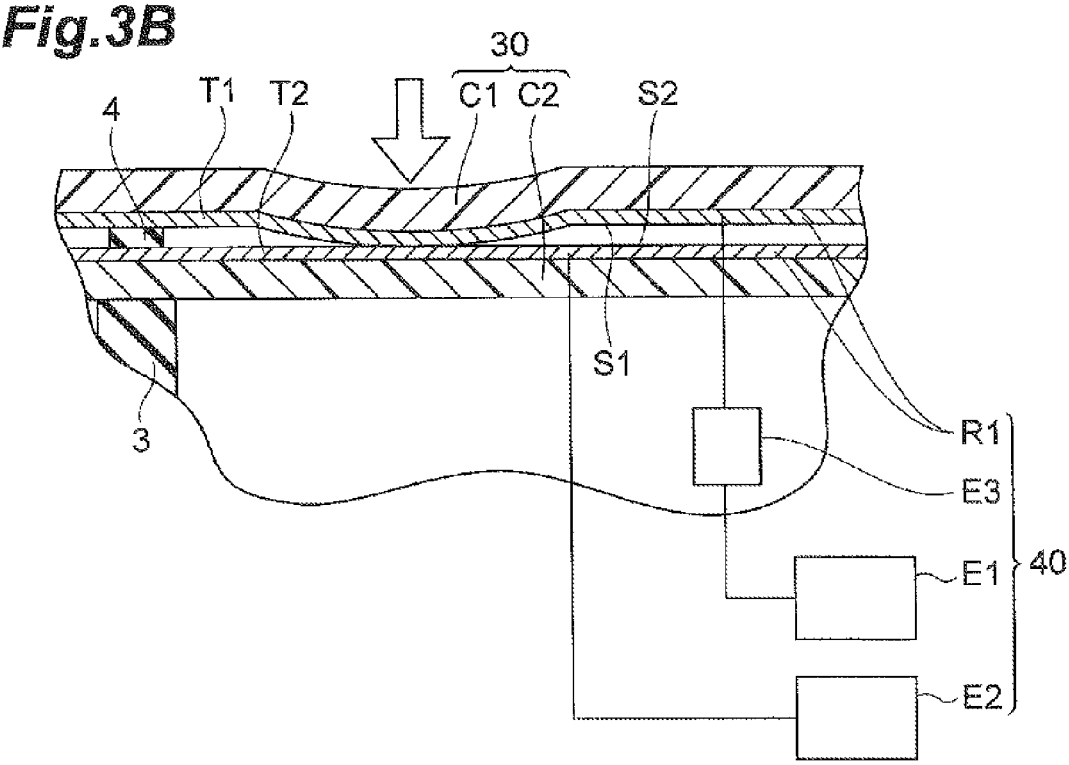

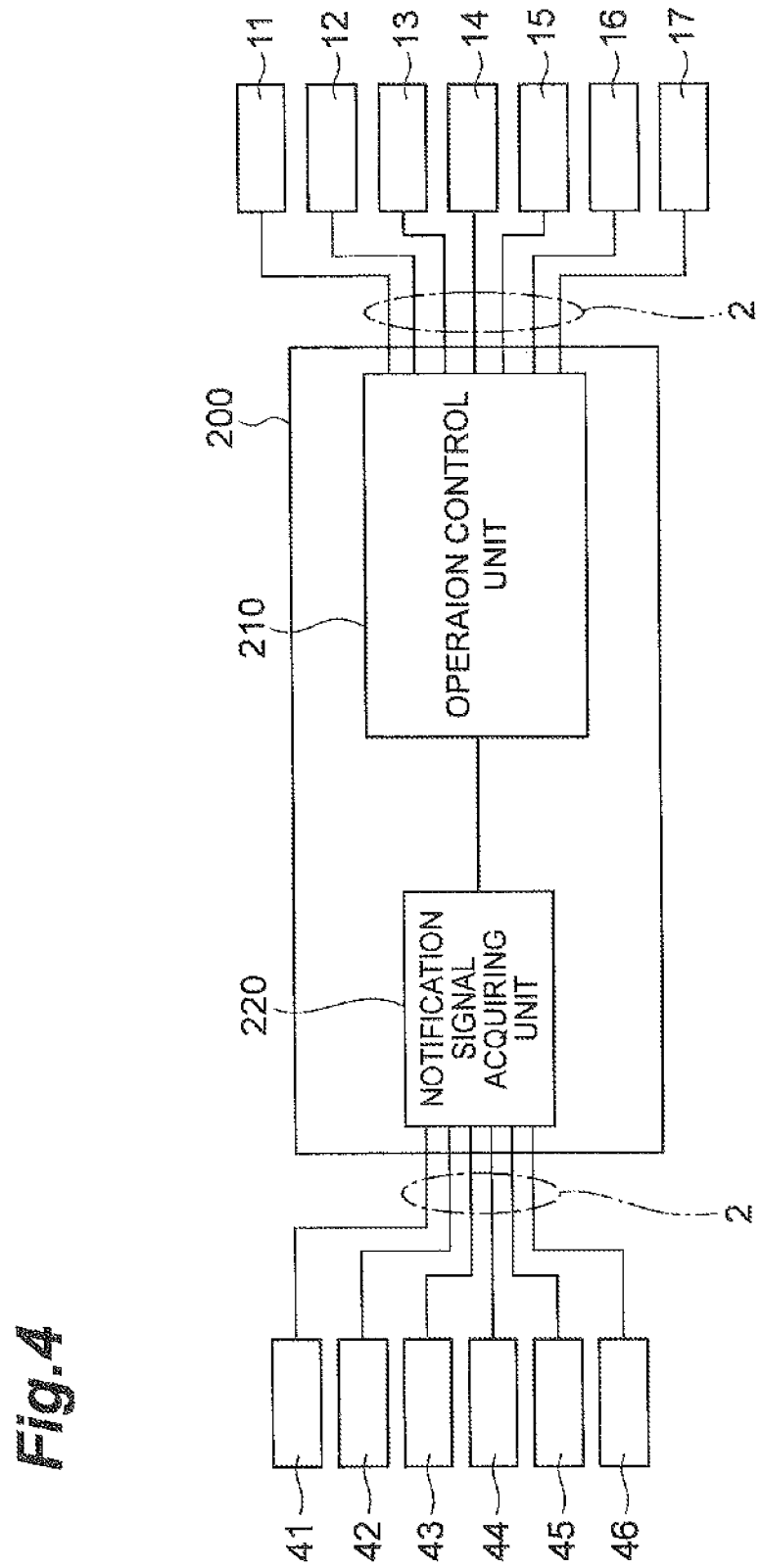

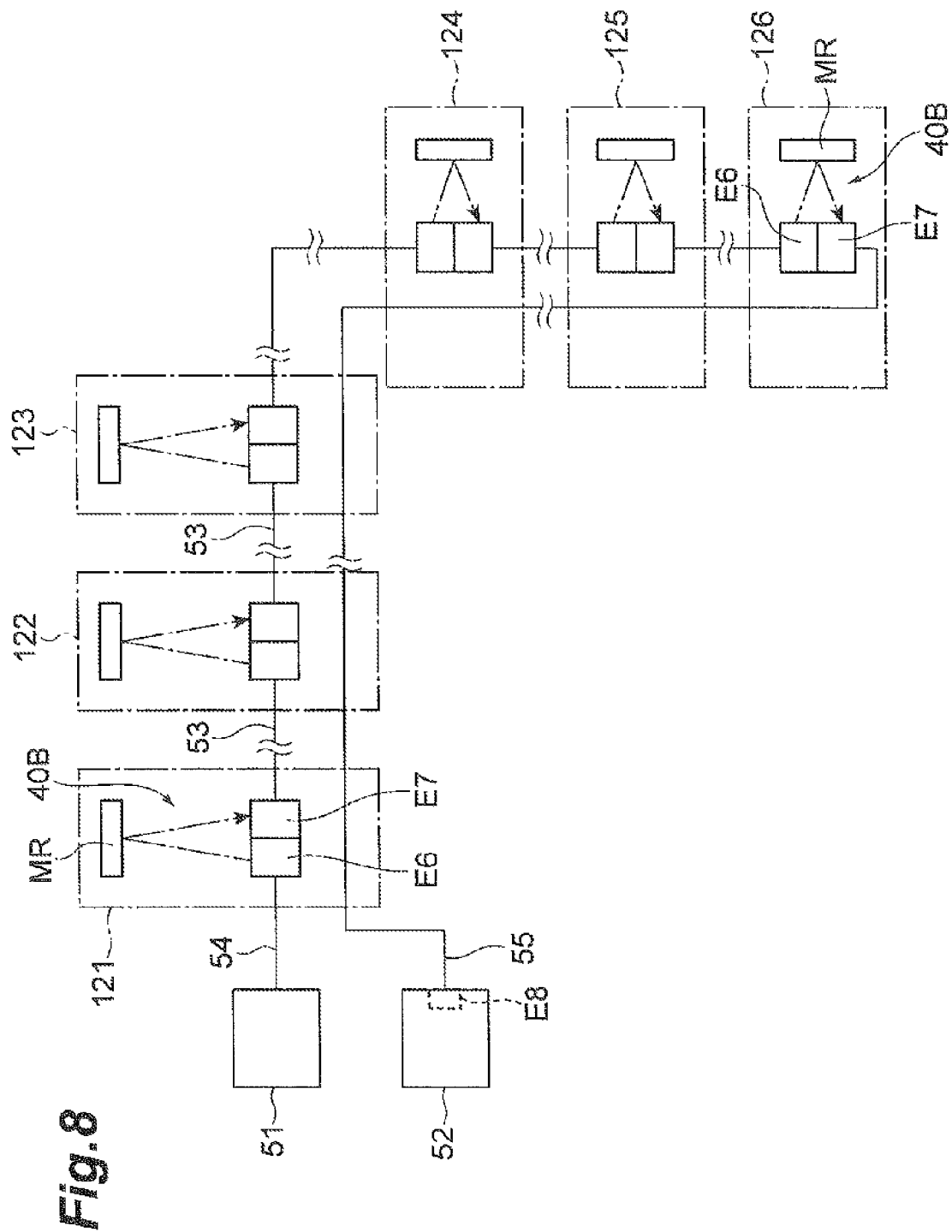

ROBOT APPARATUS

CROSS-REFERENCE TO RELATED APPLICATION

This application is based upon and claims the benefit of priority from Japanese Patent Application No. 2013-008486, filed Jan. 21, 2013, the entire contents of which are incorporated herein by reference.

BACKGROUND

1. Field

The present disclosure relates to a robot apparatus.

2. Related Art

In recent years, there has been an increasing demand for replacing a man's manual operation by an automatic operation using a robot. For example, JP2011-000669A discloses a robot that automatically performs a box packing operation.

SUMMARY

According to the present disclosure, there is provided a robot apparatus including: an arm that includes an outer skin; and a detector that detects the deformation of the outer skin, wherein the detector includes a sending unit that sends a signal, a receiving unit that receives the signal, and a transmission route that is provided along the outer skin so as to lead the signal, and wherein the detector detects the deformation of the outer skin based on whether the signal reaches the receiving unit.

BRIEF DESCRIPTION OF THE DRAWINGS

FIGS. 3A and 3B are cross-sectional views illustrating the configuration of a cover and a detector.

FIG. 4 is a block diagram illustrating the functional configuration of a controller.

FIG. 8 is a schematic diagram illustrating still other modified example of the cover and the detector.

DETAILED DESCRIPTION

Figure 1:
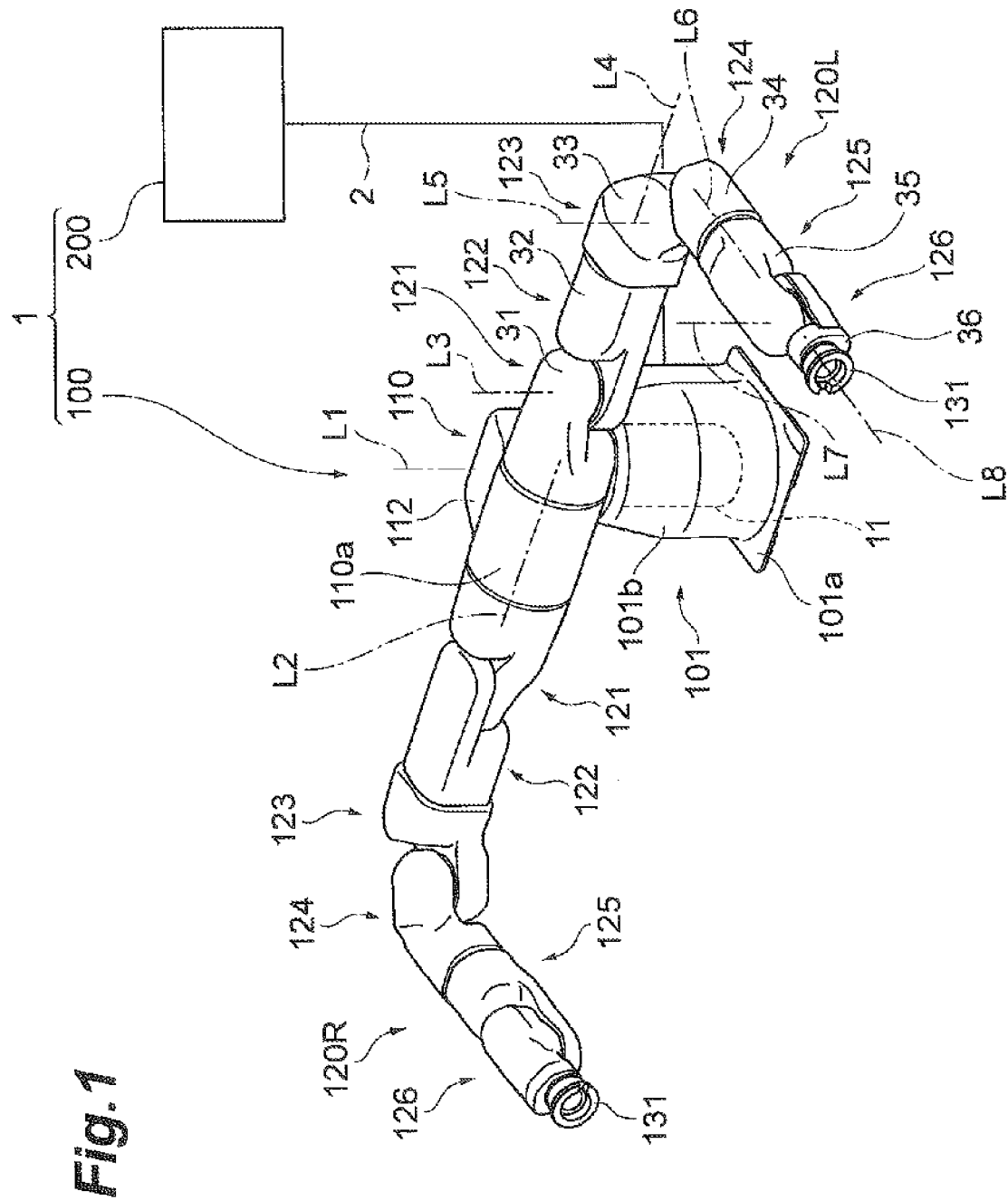
FIG. 1 is a perspective view illustrating an embodiment of a robot apparatus.

Hereinafter, an embodiment will be described with reference to the drawings. In the description, the same reference numerals will be given to the same components or the components having the same functions, and the description thereof will not be repeated.

Robot Apparatus

As illustrated in FIG. 1, a robot apparatus 1 includes a dual-arm robot 100 and a controller 200. The dual-arm robot 100 and the controller 200 are connected to each other by cable harnesses 2 for the mutual communication therebetween. Furthermore, the dual-arm robot 100 and the controller 200 may be connected wirelessly or the controller 200 may be built in the dual-arm robot 100.

The dual-arm robot 100 includes a base table 101, a body portion 110, a left arm 120L, and a right arm 120R. The base table 101 includes a bottom plate 101a and a cylindrical side wall 101b that is formed upright on the bottom plate 101a, and includes an actuator 11 built therein. The bottom plate 101a and the side wall 101b are formed by, for example, aluminum casting or the like. The base table 101 is provided on a floor or a pedestal. In the description below, the "up and down" indicates directions when the base table 101 is provided on a horizontal plane.

The body portion 110 is attached to the upper end of the base table 101. The body portion 110 is driven by the actuator 11 that is built in the base table 101 so as to rotate about the vertical axis line L1. The body portion 110 includes a reinforced member 111 that is formed of, for example, high-strength steel (so-called high-tensile steel) and a cover 112 that covers the reinforced member 111 (see FIG. 2).

The upper end of the body portion 110 is provided with an arm support portion 110a that supports the arms 120L and 120R. The arm support portion 110a is formed in a columnar outer shape that lies horizontally. The center axis line L2 of the arm support portion 110a is offset toward one side in the top view with respect to the rotation axis line L1 of the body portion 110. "Front, back, left and right" in the following explanation mean directions where it is assumed that the front is the direction in which the center axis line L2 is offset with respect to the rotation axis line L1.

Figure 2:
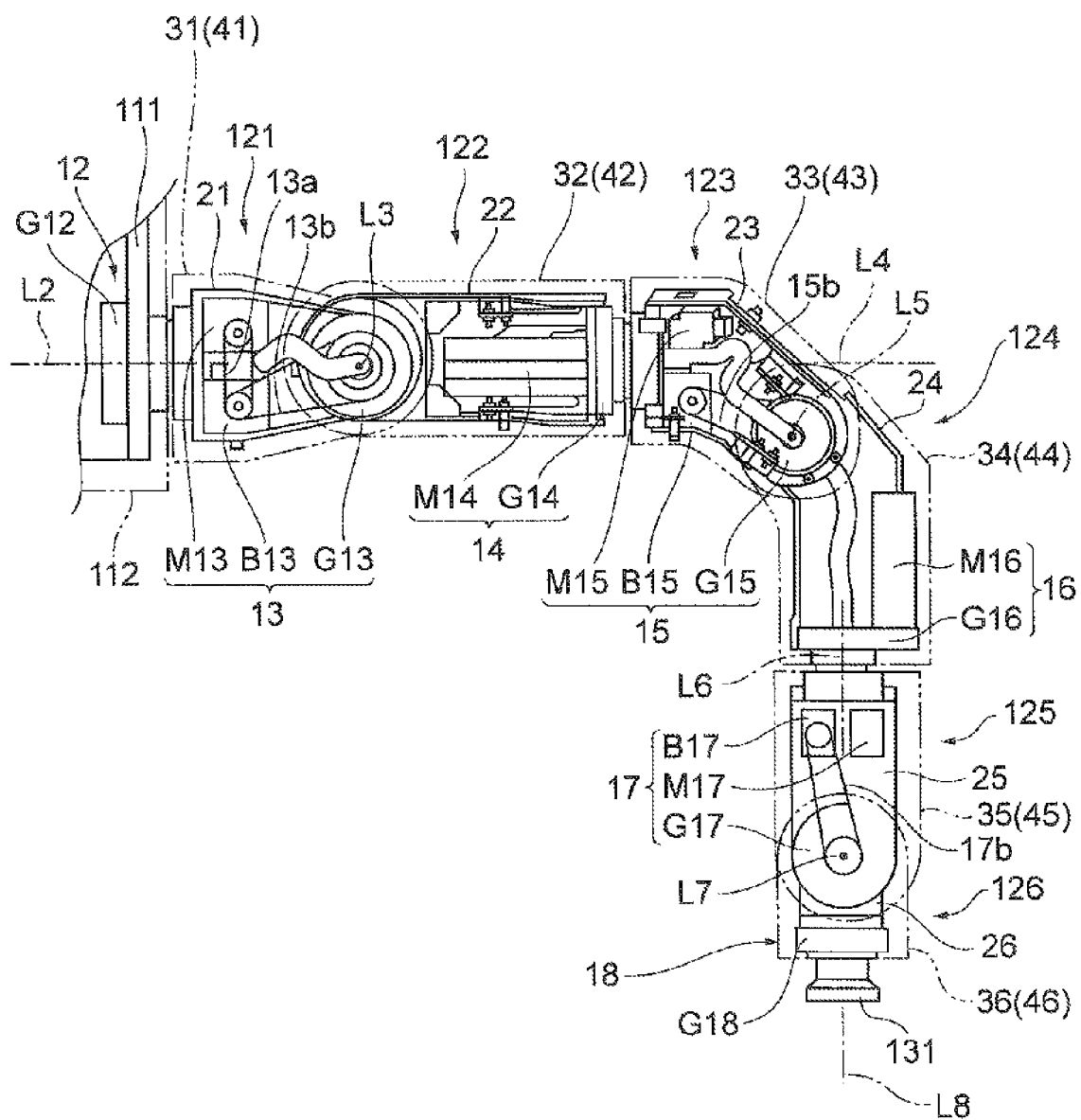
FIG. 2 is a top view of a left arm from which a cover is removed.

The body portion 110 includes two actuators 12 built therein (see FIG. 2). Each actuator 12 includes a motor (not illustrated) and a speed reducer G12. The speed reducers G12 of the two actuators 12 are respectively disposed at both ends of the arm support portion 110a, and are fixed to the reinforced member 111. The output shafts of the respective speed reducers G12 rotate about the axis line L2 along the lateral (left to front) direction.

Two arms 120L and 120R are respectively attached to both ends of the arm support portion 110a. As illustrated in FIG. 2, the left arm 120L includes a shoulder portion 121, a first upper arm portion 122, a second upper arm portion 123, a first lower arm portion 124, a second lower arm portion 125, and a wrist portion 126 as plural arm components.

The shoulder portion 121 is attached to the left end of the arm support portion 110a, and protrudes from the arm support portion 110a toward the left side (the right side of the drawing). The shoulder portion 121 includes a reinforced member 21 that is formed of, for example, high-strength steel (so-called high-tensile steel) and a cover 31 that covers the reinforced member 21. The base end of the reinforced member 21 is fixed to the output shaft of the speed reducer G12. For this reason, the shoulder portion 121 is driven by the actuator 12 of the body portion 110 so as to rotate about the axis line L2.

The shoulder portion 121 includes an actuator 13 built therein. The actuator 13 includes a motor M13, a brake B13, and a speed reducer G13. The motor M13 and the brake B13 are disposed at the base end or the shoulder portion 121, and are fixed to the reinforced member 21. The speed reducer G13 is disposed at the distal end of the shoulder portion 121, and is fixed to the reinforced member 21. The rotation shaft of the motor M13 is linked to the rotation shaft of the brake B13 via a timing belt 13a. The rotation shaft of the brake B13 is linked to the input shaft of the speed reducer G13 via a timing belt 13b. The motor M13 transmits a drive force to the speed reducer G13 via the brake B13. The brake B13 transmits a brake force to the motor M13 and the speed reducer G13. The output shaft of the speed reducer G13 rotates about the axis line L3 perpendicular to the rotation axis line L2 of the shoulder portion 121.

The base end of the first upper arm portion 122 is connected to the distal end of the shoulder portion 121. The first upper arm portion 122 continuously extends in the protrusion direction of the shoulder portion 121. The first upper arm portion 122 includes a reinforced member 22 that is formed of, for example, high-strength steel (so-called high-tensile steel) and a cover 32 that covers the reinforced member 22. The base end of the reinforced member 22 is fixed to the output shaft of the speed reducer G13 of the shoulder portion 121. For this reason, the first upper arm portion 122 is driven by the actuator 13 of the shoulder portion 121 so as to swing about the axis line L3.

The first upper arm portion 122 includes an actuator 14 built therein. The actuator 14 includes a motor M14 and a speed reducer G14. The speed reducer G14 is disposed at the distal end of the first upper arm portion 122, and is fixed to the reinforced member 22. The output shaft of the speed reducer G14 rotates about the axis line L4 that is parallel to the extension direction of the first upper arm portion 122. The motor M14 is fixed to the speed reducer G14, and the output shaft of the motor M14 is directly coupled to the input shaft of the speed reducer G14.

The base end of the second upper arm portion 123 is connected to the distal end of the first upper arm portion 122. The second upper arm portion 123 continuously extends in the extension direction of the first upper arm portion 122, and is bent at the middle portion thereof so as to form an obtuse angle. The second upper arm portion 123 includes a reinforced member 23 that is formed of, for example, high-strength steel (so-called high-tensile steel) and a cover 33 that covers the reinforced member 23. The base end of the reinforced member 23 is fixed to the output shaft of the speed reducer G14 of the first upper arm portion 122. For this reason, the second upper arm portion 123 is driven by the actuator 14 of the first upper arm portion 122 so as to rotate about the axis line L4.

The second upper arm portion 123 includes an actuator 15 built therein. The actuator 15 includes a motor M15, a brake B15, and a speed reducer G15. The motor M15 and the brake B15 are disposed at the base end of the second upper arm portion 123, and are fixed to the reinforced member 23. The speed reducer G15 is disposed at the distal end of the second upper arm portion 123, and is fixed to the reinforced member 23. The rotation shaft of the motor M15 is linked to the rotation shaft of the brake B15 via a timing belt (not illustrated). The rotation shaft of the brake B15 is linked to the input shaft of the speed reducer G15 via a timing belt 15b. The motor M15 transmits a drive force to the speed reducer G15 via the brake B15. The brake B15 transmits a brake force to the motor M15 and the speed reducer G15. The output shaft of the speed reducer G15 rotates about the axis line L5 perpendicular to the rotation axis line L4 of the second upper arm portion 123.

The base end of the first lower arm portion 124 is connected to the distal end of the second upper arm portion 123. The first lower arm portion 124 continuously extends in the extension direction of the second upper arm portion 123, and is bent at the middle portion thereof so as to form an obtuse angle. The bending direction of the first lower arm portion 124 is equal to the bending direction of the second upper arm portion 123. The distal end of the first lower arm portion 124 is substantially perpendicular to the base end of the second upper arm portion 123.

The first lower arm portion 124 includes a reinforced member 24 that is formed of, for example, high-strength steel (so-called high-tensile steel) and a cover 34 that covers the reinforced member 24. The base end of the reinforced member 24 is fixed to the output shaft of the speed reducer G15 of the second upper arm portion 123. For this reason, the first lower arm portion 124 is driven by the actuator 15 of the second upper arm portion 123 so as to swing about the axis line L5.

The first lower arm portion 124 includes an actuator 16 built therein. The actuator 16 includes a motor M16 and a speed reducer G16. The speed reducer G16 is disposed at the distal end of the first lower arm portion 124, and is fixed to the reinforced member 24. The output shaft of the speed reducer G16 rotates about the axis line L6 parallel to the extension direction of the first lower arm portion 124. The motor M16 is fixed to the speed reducer G16, and the output shaft of the motor M16 is directly coupled to the input shaft of the speed reducer G16.

The base end of the second lower arm portion 125 is connected to the distal end of the first lower arm portion 124. The second lower arm portion 125 continuously extends in the extension direction of the first lower arm portion 124. The second lower arm portion 125 includes a reinforced member 25 that is formed of, for example, high-strength steel (so-called high-tensile steel) and a cover 35 that covers the reinforced member 25. The base end of the reinforced member 25 is fixed to the output shaft of the speed reducer G16 of the first lower arm portion 124. For this reason, the second lower arm portion 125 is driven by the actuator 16 of the first lower arm portion 124 so as to rotate about the axis line L6.

The second lower arm portion 125 includes an actuator 17 built therein. The actuator 17 includes a motor M17, a brake B17, and a speed reducer G17. The motor M17 and the brake B17 are disposed at the base end of the second lower arm portion 125, and are fixed to the reinforced member 25. The speed reducer G17 is disposed at the distal end of the second lower arm portion 125, and is fixed to the reinforced member 25. The rotation shaft of the motor M17 is linked to the rotation shaft of the brake B17 via a timing belt (not illustrated). The rotation shaft of the brake B17 is linked to the input shaft of the speed reducer G17 via a timing belt 17b. The motor M17 transmits a drive force to the speed reducer G17 via the brake B17. The brake B17 transmits a brake force to the motor M17 and the speed reducer G17. The output shaft of the speed reducer G17 rotates about the axis line L7 perpendicular to the rotation axis line L6 of the second upper arm portion 125.

The base end of the wrist portion 126 is connected to the distal end of the second lower arm portion 125. The wrist portion 126 continuously extends in the extension direction of the second lower arm portion 125. The wrist portion 126 includes a reinforced member 26 that is formed of, for example, high-strength steel (so-called high-tensile steel) and a cover 36 that covers the reinforced member 26. The base end of the reinforced member 26 is fixed to the output shaft of the speed reducer G17 of the second lower arm portion 125. For this reason, the wrist portion 126 is driven by the actuator 17 of the second lower arm portion 125 so as to swing about the axis line L7.

The wrist portion 126 includes an actuator 18 built therein. The actuator 18 includes a motor (not illustrated) and a speed reducer G18. The speed reducer G18 is disposed at the distal end of the wrist portion 126, and is fixed to the reinforced member 26. The output shaft of the speed reducer G18 rotates about the axis line L8 parallel to the extension direction of the wrist portion 126. The motor is fixed to the speed reducer G18, and the output shaft of the motor is directly coupled to the input shaft of the speed reducer G18.

A flange-shaped joint portion 131 is fixed to the output shaft of the speed reducer G18. Various tools (not illustrated) for performing a desired operation by the dual-arm robot 100 are attached to the joint portion 131. The tool attached to the joint portion 131 is driven by the actuator 18 of the wrist portion 126 so as to rotate about the axis line L8.

As illustrated in FIG. 1, the right arm 120R has the same configuration as that of the left arm 120L, and is disposed in a direction opposite to the left arm 120L. The base end of the shoulder portion 121 of the right arm 120R is attached to the right end of the arm support portion 110a, and protrudes rightward from the arm support portion 110a. Since the other description of the right arm 120R is the same as that of the left arm 120L, the description thereof will not be repeated.

Cover Member and Detector

Each of the arms 120L and 120R includes detectors 41, 42, 43, 44, 45, and 46 that are provided for the respective arm components. That is, the shoulder portion 121, the first upper arm portion 122, the second upper arm portion 123, the first lower arm portion 124, the second lower arm portion 125, and the wrist portion 126 respectively include the detectors 41, 42, 43, 44, 45, and 46. The detectors 41, 42, 43, 44, 45, and 46 respectively detect the contact states of the covers 31, 32, 33, 34, 35, and 36.

Since the covers 31, 32, 33, 34, 35, and 36 have a common structure and the detectors 41, 42, 43, 44, 45, and 46 also have a common structure, these components are not distinguished in the description below. The covers are denoted by the common reference numeral 30, and the detectors are denoted by the common reference numeral 40. Further, the reinforced members are also denoted by the common reference numeral 20.

As illustrated in FIGS. 3A and 3B, the cover 30 includes an outer skin C1 and an inner skin C2 that is formed along an inner surface S1 of the outer skin C1. The outer skin C1 is formed of, for example, a resin material or a rubber material, and has elasticity. A conductive plating layer T1 is formed on the inner surface of the outer skin C1. The inner skin C2 is formed of, for example, a resin material or a rubber material, and has elasticity. A conductive plating layer T2 is formed on an outer surface S2 of the inner skin C2. The inner skin C2 is fixed to the reinforced member 20 via a support member 3 that is formed of an insulating material such as a resin material.

The outer skin C1 and the inner skin C2 are separated from each other, and the plating layers T1 and T2 are insulated from each other. Plural spacer members 4 are disposed between the outer skin C1 and the inner skin C2. Each spacer member 4 is formed of an insulating material such as a resin material or a rubber material, and keeps a fixed gap between the outer skin C1 and the inner skin C2.

The detector 40 includes a sending unit E1 that sends an electric signal, a receiving unit E2 that receives the electric signal, a transmission route R1 that is provided along the outer skin C1 so as to transmit the electric signal, and a detection circuit (detective element) E3 that detects whether the receiving unit E2 receives the electric signal.

The sending unit E1 and the receiving unit E2 are a pair of electrodes. The sending unit E1 is a plus electrode having a higher potential than that of the receiving unit E2, and is electrically connected to the plating layer T1. The receiving unit E2 is a minus electrode having a lower potential than that of the sending unit E1, and is electrically connected to the plating layer T2. The transmission route R1 includes the plating layer T1 and the plating layer T2 formed along the outer skin C1. That is, the inner surface S1 of the outer skin C1 and the outer surface S2 of the inner skin C2 have conductivity, and form the transmission route R1. The sending unit E1 may be electrically connected to the plating layer T2, and the receiving unit E2 may be electrically connected to the plating layer T1.

As illustrated in FIG. 3B, when the outer skin C1 is deformed by the peripheral contact so that the inner surface S1 of the outer skin C1 contacts the outer surface S2 of the inner skin C2, the plating layers T1 and T2 are electrically connected to each other. Accordingly, a current is generated from the sending unit E1 toward the receiving unit E2 through the plating layers T1 and T2. That is, an electric signal is led from the sending unit E1 to the receiving unit E2 by the transmission route R1.

The detection circuit E3 is provided between the sending unit E1 and the plating layer T1 and detects, for example, the current generated from the sending unit E1 toward the receiving unit E2. Accordingly, it is possible to detect whether an electric signal reaches the receiving unit E2. The detection circuit E3 sends a notification signal when detecting the current. The detection circuit E3 may be provided between the receiving unit E2 and the plating layer T2 or may be integrated with the sending unit E1 or the receiving unit E2.

Controller

The controller 200 is, for example, a computer that includes a calculation device, a storage device, and an input and output device. As illustrated in FIG. 4, the controller 200 includes an operation control unit 210 and a notification signal acquiring unit 220.

The operation control unit 210 is connected to the actuators 11, 12, 13, 14, 15, 16, and 17 through the cable harnesses 2, and drives the actuators 11, 12, 13, 14, 15, 16, and 17 so as to control the operation of the dual-arm robot 100.

The notification signal acquiring unit 220 is connected to the detectors 41, 42, 43, 44, 45, and 46 through the cable harnesses 2, and acquires the notification signals sent from the respective detection circuits E3. When the notification signal acquiring unit 220 acquires the notification signals during the operation of the dual-arm robot 100, the operation control unit 210 decelerates, for example, all actuators 11, 12, 13, 14, 15, 16, and 17. This deceleration includes stopping the actuators. Instead of decelerating the actuator, the actuator may be reversely rotated so as to reverse the operation direction of the dual-arm robot 100.

According to the above-described robot apparatus 1, the deformation of the outer skin C1 in accordance with the peripheral contact is detected by the detector 40. When the deformation of the outer skin C1 is detected, the controller 200 performs a control so that the operation of the robot apparatus 1 is stopped. Accordingly, safety may be improved.

When the dual-arm robot 100 take on some of a man's manual labor, the man and dual-arm robot 100 may coexist in a workspace. In such situation, safety may be improved.

Since the transmission route R1 of the detector 40 is formed along the outer skin C1, a signal reaching status from the sending unit E1 to the receiving unit E2 is influenced even when any portion along the transmission route R1 in the outer skin C1 is deformed. For this reason, it is possible to detect the contact over a wide area of the outer skin C1 just by detecting whether a signal reaches the receiving unit E2. Accordingly, safety may be further improved.

A signal used in the detector 40 is an electric signal, and the transmission route R1 leads the electric signal from the sending unit E1 to the receiving unit E2 when the outer skin C1 is deformed. For this reason, the detector 40 may be easily configured by the use of the characteristics of the electrical signal that is transmitted even when any one position of the transmission route R1 is electrically connected.

The inner skin C2 is provided inside the outer skin C1, and the inner surface S1 of the outer skin C1 and the outer surface S2 of the inner skin C2 have conductivity and form the transmission route R1. The sending unit E1 is electrically connected to the inner surface S1 of the outer skin C1, and the receiving unit E2 is electrically connected to the outer surface S2 of the inner skin C2. When the inner surface S1 of the outer skin C1 contacts the outer surface S2 of the inner skin C2 with the deformation of the outer skin C1, the transmission route R1 leads the electric signal from the sending unit E1 to the receiving unit E2. Since the gap between the outer skin C1 and the inner skin C2 is set to be small, the sensitivity of the detector 40 may be improved. Further, since the inner skin C2 is provided over a wide area of the inner surface of the outer skin C1, it is possible to detect the contact over a wide area of the outer skin C1. Accordingly, safety may be further improved.

The arms 120L and 120R include plural arm components, and the cover 30 and the detector 40 are provided for each arm component. For this reason, the cover 30 and the detector 40 may be disposed in the entire area of the arms 120L and 120R while enabling various operations of the arms 120L and 120R.

The rigidity of the inner skin C2 may be higher than the rigidity of the outer skin C1. Further, the inner skin C2 may not have elasticity. In such a case, since the outer skin C1 is largely deformed compared to the inner skin C2, the outer skin C1 and the inner skin C2 may easily contact each other. For this reason, the sensitivity of the detector 40 may be further improved.

Both the outer skin C1 and the inner skin C2 may be formed of a conductive material. In this case, the transmission route R1 may be formed by the outer skin C1 and the inner skin C2 without forming the conductive plating layers T1 and T2. As the conductive material, for example, conductive rubber may be exemplified. As described above, since the inner skin C2 may not have elasticity, the inner skin C2 may be formed of a metallic material.

First Modified Example

Figure 5A:
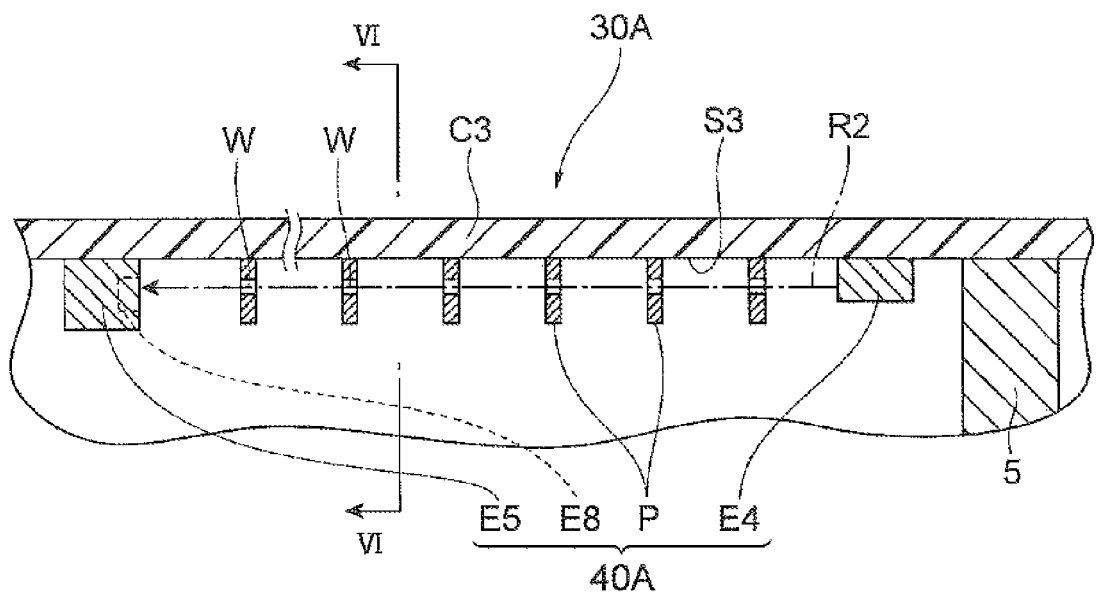
FIGS. 5A and 5B are cross-sectional views illustrating a modified example of the cover and the detector.
Figure 5B:
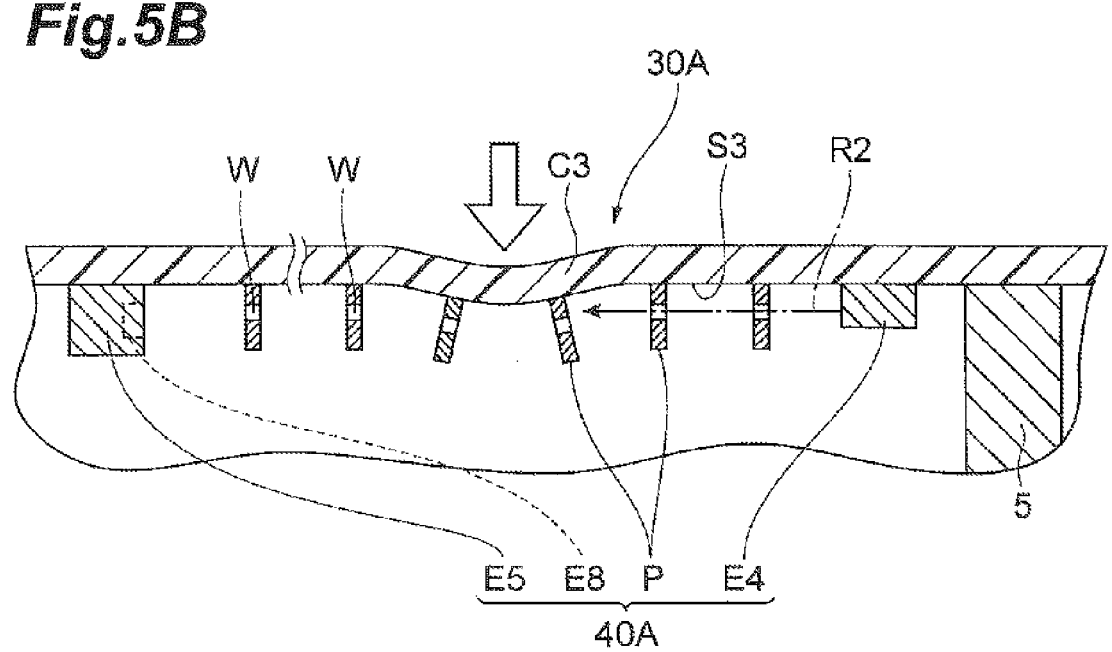

A cover 30A and a detector 40A illustrated in FIGS. 5A and 5B use an optical signal instead of an electric signal. The cover 30A includes an outer skin C3. The outer skin C3 is formed of, for example, a resin material or a rubber material, and has elasticity. The outer skin C3 is fixed to the reinforced member 20 via the support member 5.

The detector 40A includes a sending unit E4 that sends an optical signal, a receiving unit E5 that receives an optical signal, and plural light shielding plates P. The sending unit E4 and the receiving unit E5 are fixed to an inner surface S3 of the outer skin C3 while being separated from each other. The sending unit E4 and the receiving unit E5 may be fixed to the reinforced member 20 while being located in the vicinity of the inner surface S3 of the outer skin C3.

The sending unit E4 emits an optical signal along the longitudinal direction of the outer skin C3. The optical signal is, for example, a laser beam. The receiving unit E5 is disposed on an optical path R2 of the optical signal. The receiving unit E5 includes, for example, a photo diode (detective element) E8 as a component that detects an optical signal, and sends a notification signal when the optical signal is not detected from the sending unit E4.

Figure 6A:
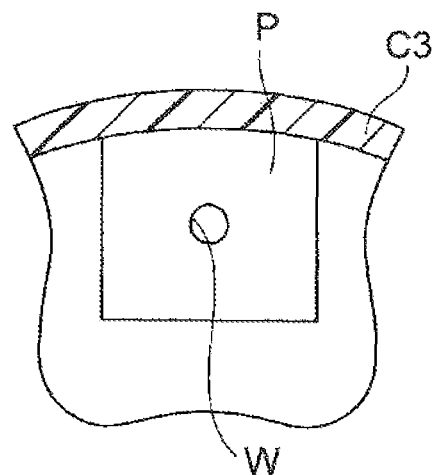
FIGS. 6A, 6B, and 6C are cross-sectional views taken along the line VI-VI of FIGS. 5A and 5B.
Figure 6B:
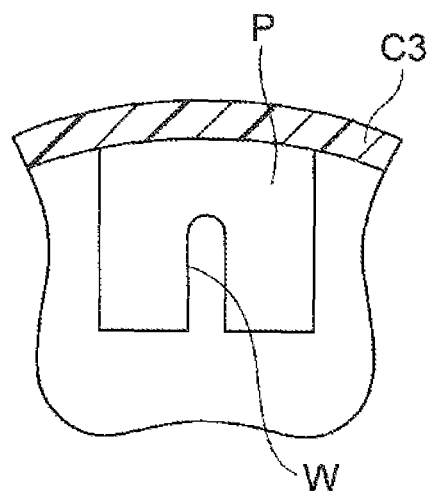
Figure 6C:
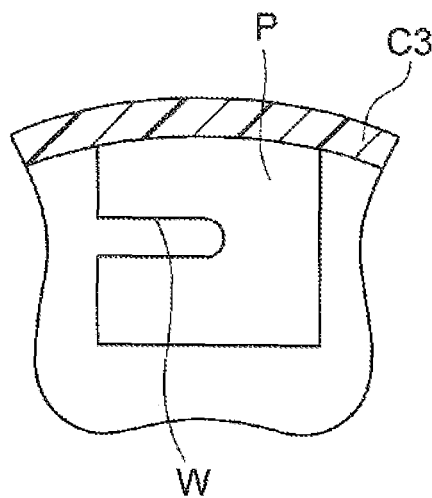

The plural light shielding plates P are arranged in series along the optical path R2, and are respectively perpendicular to the optical path R2. Each light shielding plate P is provided with a translucent window W for an optical signal. As illustrated in FIG. 6A, the translucent window W is formed in a small hole shape. As illustrated in FIG. 6B, the translucent window W is formed in a slit shape along the radial direction of the outer skin C3. As illustrated in FIG. 6C, the translucent window W may be formed in a slit shape perpendicular to the radial direction of the outer skin C3.

The translucent windows W of all light shielding plates P are arranged linearly along the optical path R2 when the outer skin C3 is not deformed. Accordingly, a transmission route R2 is configured which transmits the optical signal from the sending unit E4 to the receiving unit E5. In other words, the plural light shielding plates P are arranged in series along the transmission route R2, and respectively intersect the transmission route R2. Then, the translucent windows W are arranged linearly along the transmission route R2. The transmission route R2 leads the optical signal from the sending unit E4 to the receiving unit E5 when the outer skin C3 is not deformed.

As illustrated in FIG. 5B, when the outer skin C3 is deformed by the peripheral contact, the light shielding plates P are displaced. When the light shielding plates P are displaced, the linear arrangement of the translucent windows W becomes disordered, so that the optical signal does not reach the receiving unit E5. At this time, a notification signal is generated by the receiving unit E5.

In this way, the detector 40A uses the optical signal, and the transmission route R2 leads the optical signal from the sending unit E4 to the receiving unit E5 when the outer skin C3 is not deformed. For this reason, the detector 40A may be easily configured by using the straight advancing property of the light.

Further, in the detector 40A, the linear arrangement of the translucent windows W becomes disordered when the light shielding plates P are displaced, so that the optical signal does not reach the receiving unit E5. When the translucent window W is formed in a small size, the sensitivity of the detector 40A may be improved. Accordingly, safety may be further improved.

Second Modified Example

Figure 7A:
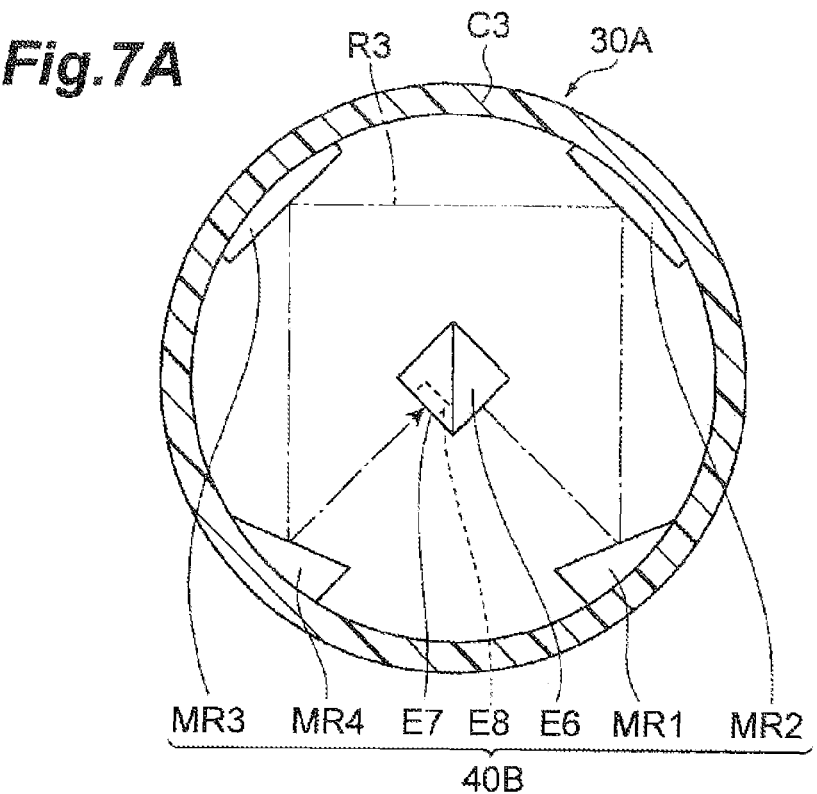
FIGS. 7A and 7B are cross-sectional views illustrating other modified example of the cover and the detector.
Figure 7B:
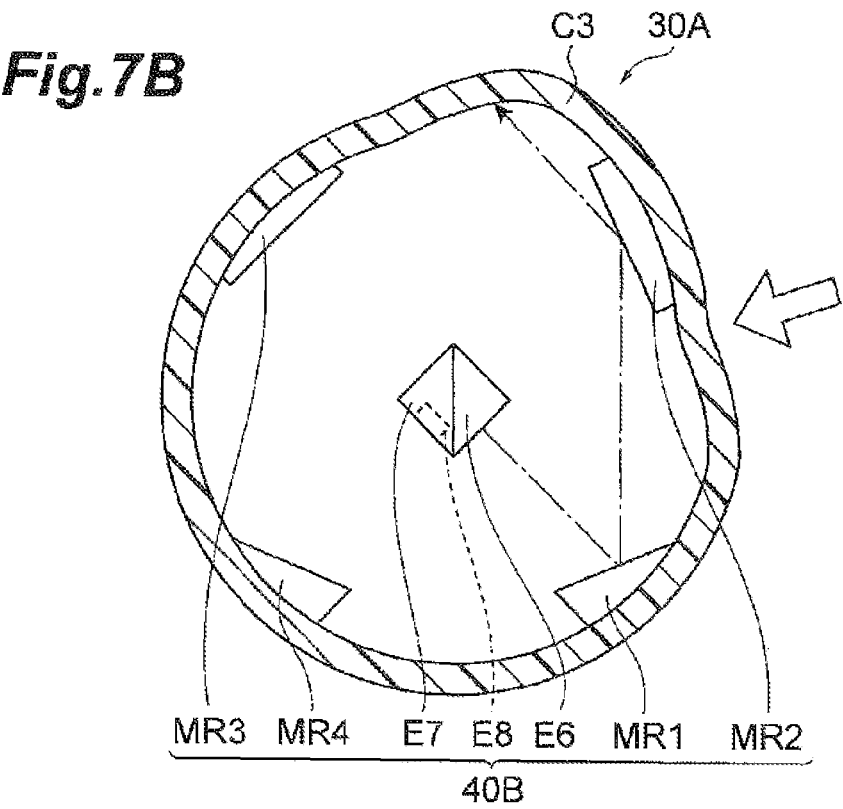

A detector 40B illustrated in FIGS. 7A and 7B also detects the deformation of the outer skin by using an optical signal. The detector 40B includes a sending unit E6 that sends an optical signal, a receiving unit E7 that receives an optical signal, and plural mirrors MR that are provided inside the outer skin C3. The number of the mirrors is not limited, and a case in which four mirrors MR1, MR2, MR3, and MR4 are provided will be described below for convenience of description.

The sending unit E6 and the receiving unit E7 are fixed to the reinforced member 20 while being adjacent to each other. The sending unit E6 emits an optical signal toward the outer skin C3. The optical signal is, for example, a laser beam. The receiving unit E7 receives the optical signal from the outer skin C3. The receiving unit E7 includes, for example, the photo diode (detective element) E8 as a component for detecting the optical signal, and generates a notification signal when the optical signal is not detected.

The mirror MR1 faces the sending unit E6, and the mirror MR4 faces the receiving unit E7. The mirrors MR2 and MR3 are disposed between the mirrors MR1 and MR4 along the circumferential direction of the outer skin C3, and are arranged in series from the mirror MR1 side to the mirror MR4 side. When the outer skin C3 is not deformed, the mirror MR1 reflects the optical signal input from the sending unit E6 toward the mirror MR2. The mirror MR2 reflects the optical signal input from the mirror MR1 toward the mirror MR3. The mirror MR3 reflects the optical signal input from the mirror MR2, toward the mirror MR4. The mirror MR4 reflects the optical signal input from the mirror MR3 toward the receiving unit E7.

The mirrors MR1, MR2, MR3, and MR4 constitute a transmission route R3 that transmits the optical signal directed from the sending unit E6 toward the receiving unit E7 along the circumferential direction of the outer skin C3. In other words, the plural mirrors MR1, MR2, MR3, and MR4 are arranged in series along the transmission route R3. The transmission route R3 leads the optical signal from the sending unit E6 to the receiving unit E7 when the outer skin C3 is not deformed.

As illustrated in FIG. 7B, when the outer skin C3 is deformed by the peripheral contact, any one of the mirrors MR1, MR2, MR3, and MR4 is displaced. When any one of the mirrors MR1, MR2, MR3, and MR4 is displaced, the optical signal advancing direction changes, so that the optical signal does not reach the receiving unit E7. At this time, a notification signal is generated by the receiving unit E7.

In the detector 40B, the optical signal transmission route R3 may be bent by using the mirrors MR along the curved outer skin C3. For this reason, the contact over a wide area of the outer skin C3 may be detected by setting the transmission route R3 across the wide area of the outer skin C3. Accordingly, safety may be further improved.

As illustrated in FIG. 8, plural detectors 40B provided for the respective arm components may be connected in series to one another by an optical fiber 53. In the configuration of FIG. 8, the sending unit E6 of each arm component does not generate the optical signal just by relaying the optical signal. The receiving unit E7 of each arm component does not detect the optical signal just by relaying the optical signal.

The receiving units E7 of the arm components except for the wrist portion 126 are connected to the sending units E6 of the adjacent arm components through the optical fiber 53. A light source 51 is connected to the sending unit E6 of the shoulder portion 121 through an optical fiber 54. The optical detection unit 52 is connected to the receiving unit E7 of the wrist portion 126 through an optical fiber 55. The optical detection unit 52 includes, for example, the photo diode (detective element) E8 as a component for detecting the optical signal, and generates a notification signal when the optical signal may not be detected. In this way, according to the configuration of FIG. 8, light source 51 and optical detection unit 52 may be consolidated as one for the whole of arm 120L and the whole or arm 120R.

While the embodiment has been described, in detail, the present invention is not limited to the above-described embodiment, and various modifications may be made without departing from the spirit of the present invention. For example, the light shielding plate P of the first modified example may be combined with the mirror MR of the second modified example. Accordingly, the contact over the wider area may be detected by setting the transmission route across the wider area. Further, the electric signal may be combined with the optical signal.

Further, in the above-described embodiment, a case has been described in which the present invention is applied to the robot apparatus having an endoskeletal structure of which the rigidity is maintained by the reinforced members 111, 21, 22, 23, 24, 25, and 26 disposed therein, but the present invention is not limited thereto. The present invention may be also applied to a robot apparatus having an exoskeletal structure of which the rigidity is maintained by an outer shell member. In this case, the outer skin and the detector of each arm component are formed at the outside of the outer shell member.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A robot apparatus comprising:
an arm that includes an outer skin; and
a detector that detects the deformation of the outer skin,
wherein the detector includes
   a sending unit that sends a signal,
   a receiving unit that receives the signal, and
   a transmission route that is provided along the outer skin so as to lead the signal,
wherein the detector detects the deformation of the outer skin based on whether the signal reaches the receiving unit,
wherein the signal is an optical signal, and
wherein the transmission route leads the optical signal from the sending unit to the receiving unit when the outer skin is not deformed.

2. The robot apparatus according to claim 1,
wherein the detector further includes a plurality of light shielding plates that is provided in the outer skin,
wherein the plurality of light shielding plates are arranged in series along the transmission route, and respectively intersect the transmission route,
wherein each light shielding plate is provided with a translucent window for the optical signal, and
wherein the plurality of translucent windows respectively formed in the plurality of light shielding plates are arranged linearly along the transmission route when the outer skin is not deformed.

3. The robot apparatus according to claim 1,
wherein the detector further includes a plurality of mirrors that are provided in the outer skin, and
wherein the plurality of mirrors are arranged in series along the transmission route, and reflects the optical signal so that the optical signal is led from the sending unit to the receiving unit when the outer skin is not deformed.

4. A robot apparatus comprising:
an arm that includes an outer skin; and
a detector that detects the deformation of the outer skin,
wherein the detector includes
   a sending unit that sends a signal,
   a receiving unit that receives the signal, and
   a transmission route that is provided along the outer skin so as to lead the signal, wherein the detector detects the deformation of the outer skin based on whether the signal reaches the receiving unit, wherein the arm includes a plurality of arm components and a plurality of actuators that respectively drive the plurality of arm components, and wherein the outer skin and the detector are provided fix each of the arm components.

5. A robot apparatus comprising:

an arm that includes an outer skin; and a detector that detects the deformation of the outer skin, wherein the detector includes
 a sending unit that sends a signal,
 a receiving unit that receives the signal, and
 a transmission route that is provided along the outer skin so as to lead the signal, wherein the detector detects the deformation of the outer skin based on whether the signal reaches the receiving unit, wherein the signal is an electric signal, wherein the transmission route leads the electric signal from the sending unit to the receiving unit when the outer skin is deformed, wherein the arm includes a plurality of arm components and a plurality of actuators that respectively drive the plurality of arm components, and wherein the outer skin and the detector are provided for each of the arm components.

6. The robot apparatus according to claim 1, wherein the arm includes a plurality of arm components and a plurality of actuators that respectively drive the plurality of arm components, and wherein the outer skin and the detector are provided for each of the arm components.

7. The robot apparatus according to claim 4, further comprising:

a controller that controls the plurality of actuators, wherein the controller decelerates the actuators or reverses the operation directions thereof when the detector detects the deformation of the outer skin.

8. The robot apparatus according to claim 5, further comprising:

a controller that controls the plurality of actuators, wherein the controller decelerates the actuators or reverses the operation directions thereof when the detector detects the deformation of the outer skin.

9. The robot apparatus according to claim 6, further comprising:

a controller that controls the plurality of actuators, wherein the controller decelerates the actuators or reverses the operation directions thereof when the detector detects the deformation of the outer skin.

10. The robot apparatus according to claim 6, wherein the detector further includes a plurality of light shielding plates that is provided in the outer skin, wherein the plurality of light shielding plates are arranged in series along the transmission route, and respectively intersect the transmission route, wherein each light shielding plate is provided with a translucent window for the optical signal, and wherein the plurality of translucent windows respectively formed in the plurality of light shielding plates are arranged linearly along the transmission route when the outer skin is not deformed.

11. The robot apparatus according to claim 6, wherein the detector further includes a plurality of mirrors that are provided in the outer skin, and wherein the plurality of mirrors are arranged in series along the transmission route, and reflects the optical signal so that the optical signal is led from the sending unit to the receiving unit when the outer skin is not deformed.

12. The robot apparatus according to claim 5, wherein the arm farther includes an inner skin that is formed along an inner surface of the outer skin and is separated from the outer skin, wherein the inner surface of the outer skin and an outer surface of the inner skin have conductivity, and form the transmission route, and wherein any one of the sending unit and the receiving unit is electrically connected to the inner surface of the outer skin, and the other thereof is electrically connected to the outer surface of the inner skin.

\* \* \* \* \*